July 23, 1963  H. SAGER  3,098,819
APPARATUS FOR THE PREPARATION OF CLEAR SOLUTIONS
Filed Sept. 13, 1960  2 Sheets-Sheet 1

United States Patent Office 3,098,819
Patented July 23, 1963

3,098,819
APPARATUS FOR THE PREPARATION OF
CLEAR SOLUTIONS
Hans Sager, Riehen, Switzerland, assignor to Hoffmann-
La Roche Inc., Nutley, N.J., a corporation of New
Jersey
Filed Sept. 13, 1960, Ser. No. 55,761
Claims priority, application Switzerland Sept. 25, 1959
7 Claims. (Cl. 210—97)

This invention relates to the filtration of liquids. More particularly, it relates to a filtration apparatus whereby liquids, particularly those intended for medical end uses, for example serums and injection solutions, may be filtered to complete freedom from solid particles.

The preparation of optically clear filtrates has particular utility in the filling of ampoules with solutions to be administered by injection. The presence of even very small amounts of solid particles in the liquid in the ampoule may result in obstruction of the passage in a hypodermic needle and thus interfere with the injection. Heretofore efforts to obtain optically clear solutions have involved cumbersome and expensive apparatus, repeated filtrations and other tedious and time-consuming techniques. Even when these were employed, it was found that they did not invariably yield optically clear solutions, usually because of recontamination with dust particles from the atmosphere during transfer of the filtrate from one vessel to another or during transfer of the filtrate into the ampoule filling apparatus.

One object of the present invention is to provide an apparatus for obtaining optically clear solutions.

Another object of the invention is to provide for the filtration of liquids without the introduction of oxygen or contaminants into the material being filtered.

Still another object of the invention is to provide an apparatus wherein a liquid may be repeatedly filtered until an optically clear filtrate is obtained, and wherein the repeated filtrations may be automatically caused to occur one after another promptly upon completion of each filtration.

These and other objects are achieved by the use of the procedure hereinafter described, preferably with the apparatus shown by way of illustration in the drawings in which.

Figure 1:
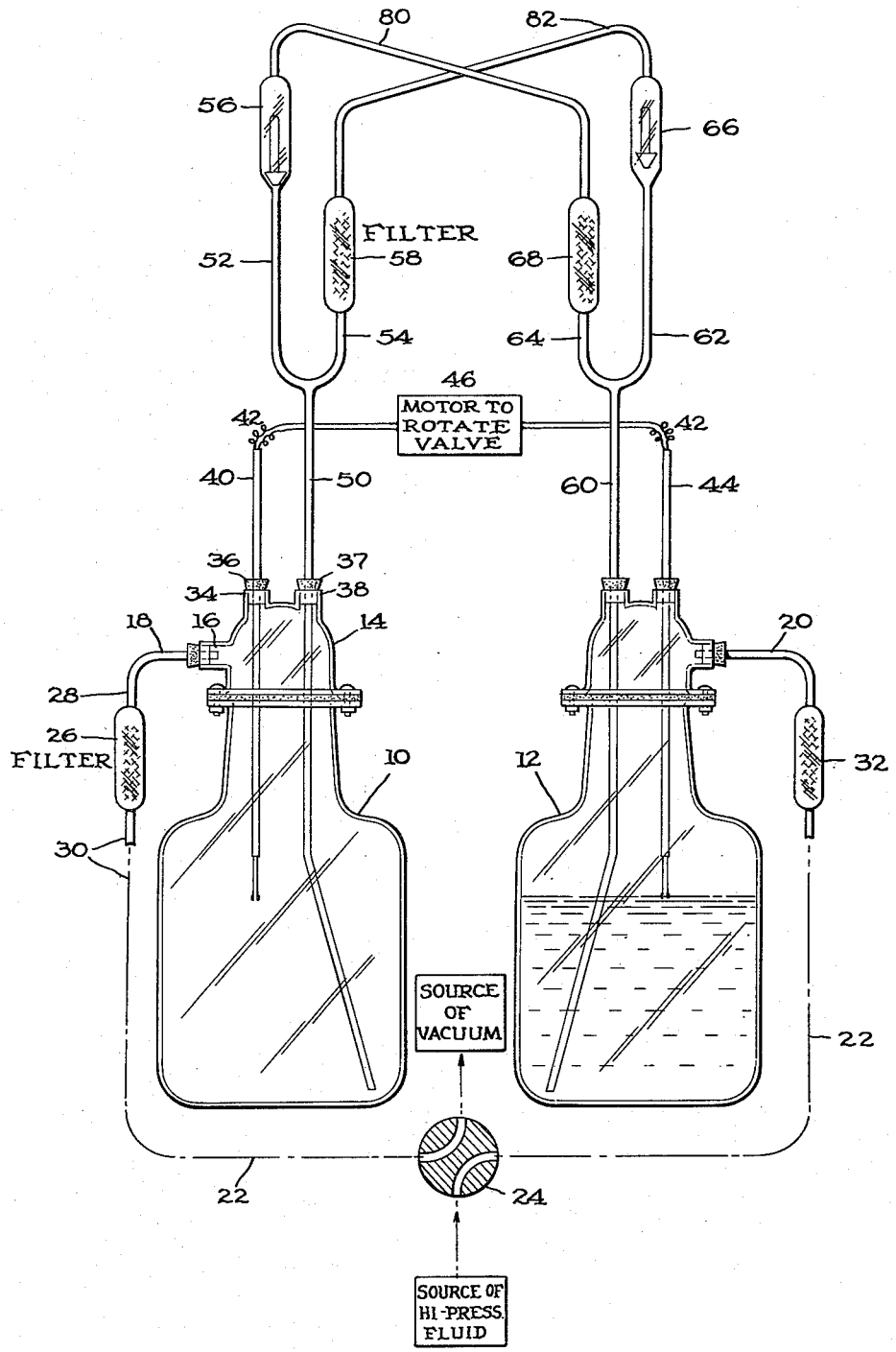
FIGURE 1 is a schematic view of a preferred apparatus.
Figure 2:
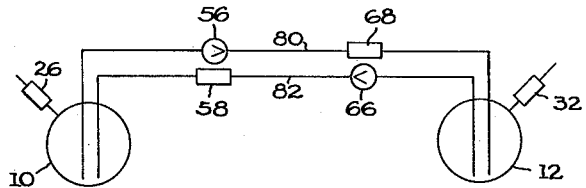
FIGURES 2 through 6 represent modifications of the apparatus of FIGURE 1.
Figure 3:
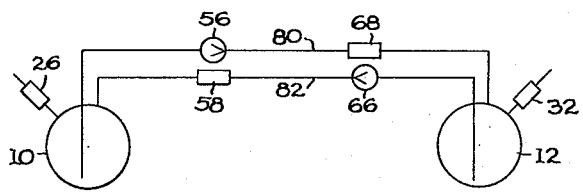

The continuous filtering apparatus shown in FIGURE 1 comprises two open-mouth flasks interconnected by conduits so that the liquid contents of the two flasks may be transferred alternately back and forth from one flask to the other through a closed system. As shown, the system includes filtering devices whereby solid contaminants are removed from the liquid during transfer from one flask to the other. Furthermore the arrangement of conduits is such as to exclude the introduction of additional contaminants into the liquid undergoing clarification. In addition means are provided to effect the automatic repetition of the filling and emptying operations for an indefinite number of cycles, until the desired optically clear filtrate is obtained.

The filtering apparatus comprises two flasks 10 and 12, each provided with a specially designed cover for its open mouth. Each cover 14 is secured to its flask in any known fashion, to provide a gas and air-tight joint. Each of the specially designed covers 14 is provided with three passages through which various portions of the apparatus are placed in direct communication with the contents of the two flasks.

One of these passages 16 is adapted to receive a conduit 22 which terminates in a side arm 18 extending in a generally horizontal direction from the vertical side portion of cover 14. The connection between side arm 18 and cap 14 is made air-tight by use of a rubber stopper, gasketing, rubber tubing, or cement, or in any other conventional way. At its other end conduit 22 terminates in a similar side arm 20 which extends into passage 16 of the cover member 14 for flask 12.

A sintered glass (bacteriological) filter 26 is interposed between vertical portions 28 and 30 of conduit 22, extending downwardly from side arm 18 and similar filter 32 is present in the branch of the conduit 22 extending downwardly from side arm 20. A two way valve 24 in conduit 22 serves to connect one of the flasks with a source of low pressure and serves simultaneously to connect the other flask with a source of air or inert gas. (In a modified form of apparatus the first flask is connected with a source of gas under pressure and the other flask is connected with the atmosphere.)

Each of the other two passages in cover 14 extends vertically through the cover. Extending downwardly through passage 34 in cover 14, there is a liquid-level sensing electrode 40. The specific electrode forms no part of the present invention and hence any suitable known device may be used, for example that shown in Nickum Patent 1,398,270. Of course it is essential that the electrode be formed of materials which are chemically inert toward and do not contaminate the liquid being processed. Leads 42 are provided to electrically connect the electrode to control means for a motor 46, which latter is in turn mechanically connected to valve 24 so as to rotate the valve (90° clockwise, from the position shown in FIGURE 1) upon energization of the control means through electrode 40. A similar electrode 44 extends downwardly through cover 14 into flask 12. Each of the liquid level sensing electrodes is mounted in a sealing means, such as a rubber stopper 36, so as to permit vertical adjustment of the terminal portions within the flask while retaining an air-tight joint through closure 14.

The other passage 38 provided in cover 14 is adapted to receive a generally vertical tube 50 having a lower end which terminates adjacent the bottom of flask 10. The upper portion of tube 50 extending upwardly from a one-hole stopper 37 separates into two branches 52 and 54. A similar tube 60 extends through a similar passage in the other cover 14, downwardly to the lower portion of flask 12 and upwardly until it forms two branches 62 and 64.

The two branches of tubes 50 and 60 are connected as follows. Check valves 56 and 66 are provided in the upwardly extending portions of branches 52 and 62 respectively and filters 58 and 68 are provided in the upwardly extending portions of branches 54 and 64 respectively. Branches 52 and 64 are connected by a conduit 80 which extends between check valve 56 and filter 68 and branches 54 and 62 are connected by a conduit 82 which extends between check valve 66 and filter 58.

Preferably check valves 56 and 66 are at a somewhat higher elevation than filters 58 and 68 and conduits 80 and 82 are inclined downwardly toward filters 68 and 58, as shown, to facilitate the efficient operation of the system.

While it is believed that the operation of the apparatus will be readily appreciated from the above, one procedure will next be described.

Starting with the apparatus in the condition shown in FIGURE 1, with a liquid requiring clarification in flask 12 and with no liquid in flask 10, flask 10 is connected to a source of vacuum by properly orienting valve 24, e.g. to the position shown in FIGURE 1. The valve may be rotated either manually or by motor drive. The low pressure, which may be created by a jet from a water pump, or by any other suction or vacuum producing means, is transmitted through conduit 22, filter 26 and side arm 18 to the interior of flask 10.

Because of the lowered pressure in flask 10 as compared with the pressure existing in flask 12 and because flasks 10 and 12 are connected through tubes 50 and 60, the liquid in flask 12 is sucked up within tube 60 up to the branching arms 62 and 64. Because check valve 56 prevents the downward flow of liquid in branch 52 which is connected to branch 64 through tube 80, the liquid emerging from flask 12 proceeds through branch 62 past check valve 66, thence into tube 82, thence through filter 58 and finally into tube 50 which conveys the filtered liquid into flask 10. Whenever the level of the liquid rising in flask 10 reaches the sensing tip portions of electrode 40, the electrical circuit to motor 46 is closed and motor 46 is then energized long enough to effect a rotation (90° clockwise) of valve 24 whereby the connection between flask 10 and the source of low pressure is broken and a new connection between the source of low pressure and flask 12 is established.

The diminished pressure in flask 12, transmitted to the interior of the flask through side arm 20, causes the liquid in flask 10 to be sucked up tube 50, branch 52, arm 80, filter 68 and thence downwardly through tube 60 and into flask 12. Filling of flask 12 and emptying of flask 10 continues until the level of the liquid reaches the tip portions of electrode 44, whereupon motor 46 is again energized and valve 24 is again turned 90°, to effect a repetition of the transfer of liquid from flask 12 to flask 10 as described above.

In this manner the liquid is alternately filtered successively by filters 58 and 68 for any desired number of cycles, until it is optically clear.

After an optically clear liquid has been obtained, it may be transferred directly to the point of use. One means for achieving this could be a ground glass ball joint (not shown) in either tube 50 or 60, provided with a T connection so that liquid being expelled from one flask, would be charged into an ampoule or other confining means directly after it has passed through either filter 58 or 68, without any exposure to the atmosphere or other sources of contamination.

A cross connection containing a valve (which connection has not been shown) is normally provided between side arms 18 and 20 to balance or equalize the pressure between the two flasks upon completing the filtration.

The apparatus described above may be adapted to filtration under pressure instead of under vacuum by making a very simple change, namely by providing a supply of chemically inert gas under pressure in place of a vacuum or source of low pressure. The pressuring gas, admitted through valve 24, passes through either filter 26 or 32 before it is brought into contact with the fluid being transferred. Thus with the apparatus as shown in FIGURE 1 and valve 24 connecting flask 12 with inert gas under pressure, the liquid in flask 12 would be expelled upwardly through tube 60 and branch 62, past valve 66, into tube 82, through filter 58 in branch 54 and into flask 10 through tube 50. The gas displaced from flask 10 could be recovered as it leaves valve 24, or permitted to discharge into the atmosphere.

Furthermore, with the arrangement shown in FIGURE 1, it is possible to alternate operation under pressure and vacuum.

Figure 4:
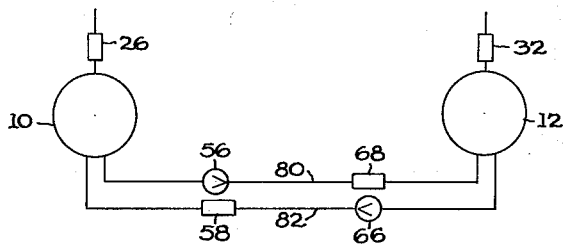
Figure 5:
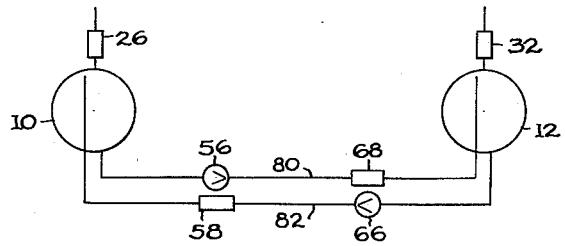
Figure 6:
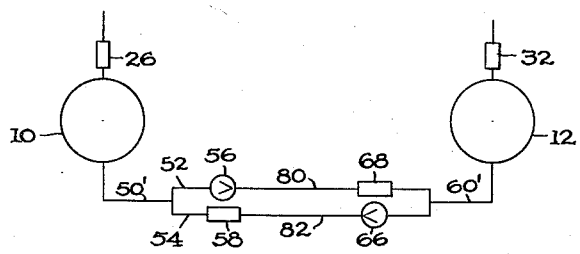

FIGURES 2 through 6 show diagrammatic arrangements of further modifications of the apparatus of FIGURE 1. In FIGURES 2 through 5, each of tubes 80 and 82 is separately connected with each of the containers 10 and 12. In FIGURES 4 through 6, the connections of the tubes 80 and 82 to the containers 10 and 12, respectively, are through the bottom of the containers, rather than through the top of the containers as in the other modifications of the apparatus discussed above. With the exception of the bottom connection of tubes 80 and 82, it will be seen that the modification of FIGURE 6 is otherwise analogous to that of FIGURE 1.

It will be evident that still other changes may be made without departing from the spirit of the invention. For instance, connections may be provided for isolating the individual filters so that a finer filter could be substituted for a coarser filter between filtrations without dismantling the apparatus.

I claim:

1. A fluid-tight apparatus for the repeated filtration of liquids to remove contaminants therefrom which comprises:

two open mouth flasks, said flasks comprising a first flask containing liquid to be filtered and a second flask adapted to receive said liquid after it has been filtered;

a cover seated on the mouth of each flask to form an air tight joint;

means including two conduits connecting the lower portions of said two flasks to one another;

at least one filter and one check valve in each of said two conduits disposed so that the passage of liquid from the first flask to the second flask is permitted in the first of said conduits while it is prevented in the reverse direction and the passage of liquid from the second flask to the first flask is permitted in the second of said conduits while it is prevented in the reverse direction;

two sources of gas under pressure, the first of said sources of gas being at a pressure greater than the second of said sources of gas;

a third conduit means connecting the upper portions of said two flasks with said two sources of gas under pressure;

a valve in said third conduit, said valve having two separate and distinct passages therein; said valve being movable to a first position wherein the first of said passages in said valve connects the first of said flasks to the source of higher gas pressure and the second of said passages in said valve connects the second of said flasks to the source of lower pressure gas whereby the liquid contained in said first flask is transferred through the first conduit and the filter therein and into the second flask, and said valve being movable to a second position wherein the first of said passages in said valve connects the second of said flasks with the source of higher pressure gas and the second of said passages in said valve connects the first of said flasks with the source of lower pressure gas whereby the liquid is caused to be returned from the second flask to the first flask in which it was originally present by passage through said second conduit and the filter therein and means to actuate said valve after each transfer is completed between said first and said second positions whereby said liquid is repeatedly filtered on passage alternately through said first and second conduits and the filters therein.

2. The apparatus of claim 1 wherein the source of lower pressure gas is a partial vacuum and the liquid is transferred by suction.

3. The apparatus of claim 1 wherein the source of higher pressure gas is an inert gas under superatmospheric pressure.

4. The apparatus of claim 1 wherein the first and second conduits comprise branches of a single conduit emerging from each flask.

5. The apparatus of claim 4 wherein each of the branches is inclined downwardly in the direction in which liquid flow is permitted.

6. The apparatus of claim 1 wherein one of the flasks has in addition, means connecting it to an ampoule filling device.

7. The apparatus of claim 1 in which filters are interposed in said third conduit means between the sources of gases under pressure and the flasks.

References Cited in the file of this patent

UNITED STATES PATENTS

| | | |
|---|---|---|
| 565,973 | Fowler | Aug. 18, 1896 |
| 2,364,244 | Roberson | Dec. 5, 1944 |
| 2,777,816 | Schumacker et al. | Jan. 15, 1957 |